(12) United States Patent
Singleton et al.

(10) Patent No.: US 8,943,912 B1
(45) Date of Patent: Feb. 3, 2015

(54) PROXIMITY PROBE MOUNTING DEVICE

(76) Inventors: Ken E. Singleton, Bristol, VA (US); Barry T. Cease, Charleston, SC (US)

(*) Notice: Subject to any disclaimer, the term of this patent is extended or adjusted under 35 U.S.C. 154(b) by 895 days.

(21) Appl. No.: 13/068,128

(22) Filed: May 3, 2011

Related U.S. Application Data (60) Provisional application No. 61/343,752, filed on May 3, 2010.

(51) Int. Cl.
  *G01B 7/14* (2006.01)
  *G01B 21/16* (2006.01)
  *G01D 11/00* (2006.01)
  *G01D 11/16* (2006.01)
  *G01D 11/30* (2006.01)

(52) U.S. Cl.
  USPC ..... 73/866.5; 73/1.79; 73/865.9; 324/207.22; 324/207.26; 324/662; 324/671

(58) Field of Classification Search
  CPC .......... G01B 7/14; G01B 7/144; G01B 21/16; G01D 11/00; G01D 11/16; G01D 11/30
  USPC ........................... 73/1.79, 1.81, 865.9, 866.5; 324/207.22, 207.26, 222, 662, 671
  See application file for complete search history.

(56) References Cited

U.S. PATENT DOCUMENTS

| | | | | |
|---|---|---|---|---|
| 4,190,961 A | * | 3/1980 | James et al. | 73/1.79 X |
| 4,785,242 A | * | 11/1988 | Vaidya et al. | 324/207.25 |
| 4,922,197 A | * | 5/1990 | Juds et al. | 324/207.26 X |
| 5,509,310 A | * | 4/1996 | El-Ibiary | 73/660 |
| 6,227,061 B1 | * | 5/2001 | Thermos | 73/866.5 |
| 6,408,705 B1 | * | 6/2002 | Thermos | 73/866.5 |
| 6,534,979 B1 | * | 3/2003 | Wineland | 73/866.5 X |
| 6,789,422 B1 | * | 9/2004 | Ward, Jr. | 73/462 |
| 6,879,144 B2 | * | 4/2005 | Ort et al. | 324/207.26 X |
| 7,111,407 B2 | * | 9/2006 | Jones | 33/366.12 |
| RE39,843 E | * | 9/2007 | Wineland | 73/866.5 X |
| 8,222,760 B2 | * | 7/2012 | Menke | 290/44 |
| 2004/0135587 A1 | * | 7/2004 | Ort et al. | 324/662 |

FOREIGN PATENT DOCUMENTS

| | | | | |
|---|---|---|---|---|
| EP | 2169345 A1 | * | 3/2010 | G01B 7/14 |
| GB | 1209030 A | * | 10/1970 | G01B 7/14 |
| GB | 1349230 A | * | 4/1974 | G01B 7/14 |
| GB | 1431984 A | * | 4/1976 | G01B 7/14 |
| GB | 2129044 A | * | 5/1984 | 70/264 |
| JP | 2000088136 A | * | 3/2000 | F16K 37/00 |
| WO | WO 03060453 A1 | * | 7/2003 | G01M 1/36 |

OTHER PUBLICATIONS

Richard Nordquist, "Threw, Through, and Thru—Commonly confused Words" downloaded Jun. 2014, About.com Grammar & Composition, 1 page, http://grammar.about.com/od/alightersideofwriting/a/Threw-Through-And-Thru.htm.*

* cited by examiner

*Primary Examiner* — Thomas P Noland (57) ABSTRACT

A proximity probe device for detecting rotating shaft deviation, wherein a rigid body has a pair of flat magnets for forcibly seating against a substantially flat surface area of a shaft bearing housing of magnetizable material, a threaded bore through the body for holding a proximity probe having a mating threaded casing, an angle indicator for assisting in placing the body on the surface area and a pair of spaced shoulders on a proximate edge surface of the body, wherein a sight plane for each of the shoulders is substantially tangential to the surface of a shaft in the shaft bearing housing to aid in aiming the probe at a desired location on the shaft surface.

17 Claims, 14 Drawing Sheets

Diagram showing typical internal mounting scheme for proximity probes

Proximity Probes Installed in True Horizontal and Vertical Directions

FIG. 23

Proximity Probes Installed at 45 Degrees

FIG. 24

Proximity Probes Have a Linear Range Where the DC (Gap)
Voltage Changes with the Distance of the Probe Tip to the Shaft

FIG. 25

PROXIMITY PROBE MOUNTING DEVICE

This application claims priority under 35 U.S.C. 119(e)(1) based on Applicants Provisional U.S. Patent Application Ser. No. 61/343,752 filed May 3, 2010 and titled "CMS REMOVABLE PROXIMITY PROBE MOUNTS".

BACKGROUND OF THE INVENTION

1. Field

This invention concerns a unique mounting device for eddy current or capacitive probes or the like which are typically used to detect and measure deviations in shaft balance, misalignment, rotor rubs, vibration or the like of rotating shafts, and finds particular use for mounting a proximity probe accurately on the face of a sleeve bearing housing whereby high visibility is afforded by way of the geometric configuration and other features of the device for aiding the mounting procedure.

2. Prior Art

Figure 18:
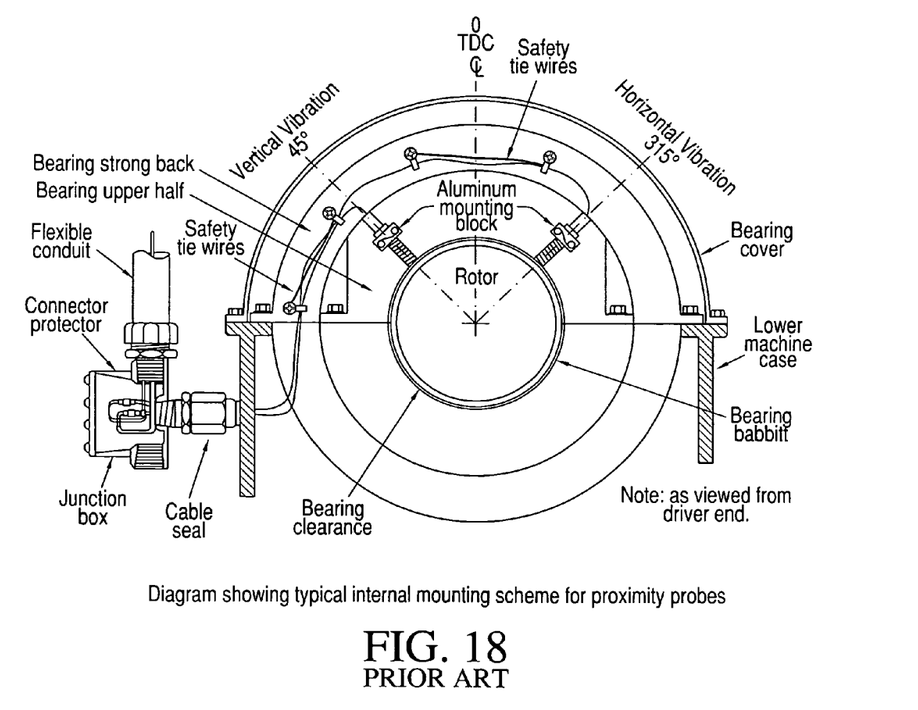
Figure 19:
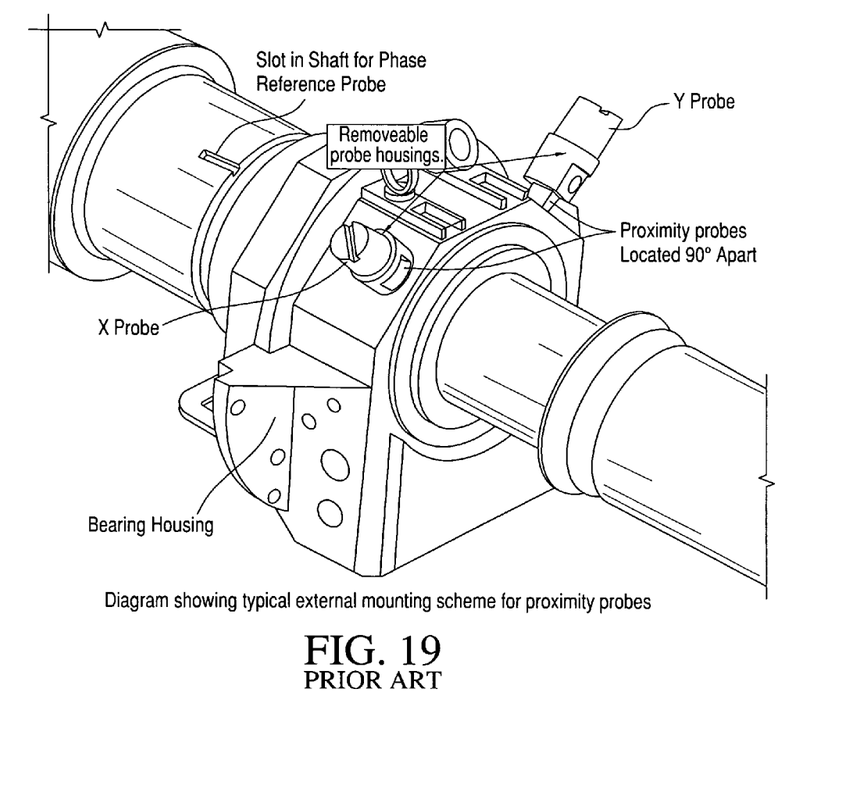

Proximity (Eddy Current or Capacitive) probes typically are installed either internally, i.e., to the bearing housing (see FIG. 18) or externally (see FIG. 19). Referring to prior art FIG. 18, proximity probe body is typically ⅜-24 thread (English) and is screwed into the probe mounting blocks. Two probes are typically installed at each bearing 90 degrees apart. The probe mounting blocks may be fabricated of steel, aluminum or non-conductive material. The blocks are attached to the end of the bearing with small screws. The probe wire is tied using safety wire ties to prevent damage from the spinning shaft. Among the disadvantages of this type of mounting are that the installation requires an extensive shutdown of the machine, and once installed, the probes are not easily accessed for adjustment or replacement since the machine must again undergo an extensive shutdown involving adequate cooling of the machine and then proper removal of the bearing housings before the probes can be accessed.

Referring to prior art FIG. 19, the probes are screwed into a threaded holder which is then screwed into a probe holder or housing. This probe housing typically has 1" National Pipe Thread and is screwed into a tapped hole in the bearing housing. Disadvantages of this type of mounting include (a) as with the internal mounting described above, installation requires an extensive shutdown of the machine in order to accurately machine the bearing housings for probe use, and (b) a mechanic or technician climbing on the machine may use the probe housings for a hand hold or may step on the probes causing distortion or damage to the probe housing or holder. Also, the probes could then, after the repairs are made, be screwed closer to or further from the shaft than required giving a false reading in the shaft position within the bearing. Further, if the probe housing were loosened then the probe itself may be loose and the readings would not be stable or accurate.

Applicants principal objective is to provide a probe mounting device that permits temporary, releasable mounting of proximity probes (also called Eddy Current probes or Capacitive Probes) to a standard sleeve bearing housing such as a Dodge Sleevoil type. The present temporary mounting of proximity probes is particularly useful when diagnosing shaft deviation such as vibration of the shaft relative to the bearing housing of fluid film bearings which bearings generate a hydrodynamic oil wedge which supports the shaft or journal. The journal can be thought of as floating on the oil wedge similar to a ship floating on water.

Detailed information on Capacitive Proximity Probes can be found in the following articles.

Uprating and Refurbishing Hydro Powerplants VI

October 1997

Montreal, Canada

A New Capacitive Proximity Probe to Overcome

Eddy Current Probe Limitations

Jackson Lin, B.Sc., MBA

Vibrosys™ Inc.

Longueuil (Quebec) CANADA

And

CIGRE/IEEF/EPRI Rotating Electric Machinery Colloquium

September 1999, Lake Buena Vista, Fla., USA

Using a Capacitive Proximity Probe

To Solve Electrical Runout Problems for a

Chrome-plated Rotor of a Boiler Feed Pump

Authors:
 Elton Floyd, TXU
 Roger Wrenn, Fluor Global Services
 Jackson Lin, VibroSystM

SUMMARY OF THE INVENTION

A proximity probe device for detecting rotating shaft deviation, wherein a rigid body has a pair of magnets for forcibly seating against a substantially flat surface area of a shaft bearing housing of magnetizable material, a threaded bore through said body receiving a proximity probe having a mating threaded casing, and positioning means on said body for aiming the probe at a desired location on the shaft surface.

BRIEF DESCRIPTION OF THE DRAWINGS

The invention will be understood further from the drawings herein and the following description wherein.

FIG's. 18 and 19 are self explanatory views of prior art probe devices; and

Briefly described the present device uses preferably two rare earth flat magnets on a body of the device to hold the body securely to the face of a bearing housing. A bubble level mounted on a protractor angle gauge pivotally mounted on the body allows positioning of the device with its center or vertical axis (and the probe axis) 38 at the desired angle, e.g., 45 degrees to the vertical diameter "TDC" of the machine shaft. Two or more jacking screws are provided as aids to overcoming the strong magnetic force when removing the device from the bearing housing or when adjusting the position of the device thereon. Two machined surfaces on proximal edges of the body of the device facilitate alignment of the probe axis with the centerline (axis) of the machine shaft by contact of the surfaces with a machined raised surface typically provided on large sleeve bearing housings concentric with the shaft on the bearing housing, or by visual adjustment of the device on the bearing housing face using the surfaces as sight lines. Other machined surfaces are provided on the body for use with a bubble level or other straight edge to help orient the device to the desired angular position about the shaft.

In certain situations it would be preferable to permanently install proximity probes on rotating shaft machinery using either the internal or external bearing mounting procedures. However, due to both the cost and time typically involved to install such systems, it is not always practical or feasible to do so. The present device is intended, primarily, to be used for temporary or short duration mounting of proximity probes for taking accurate measurements of shaft deviation either during load changes or transient conditions such as startup or shutdown.

Sleeve type bearings are typically used on large Induced Draft Fans (ID), Forced Draft Fans (FD), process fans, turbines, large motors, and the like. Temporary mounting of the present proximity probes is particularly useful, e.g., when diagnosing shaft vibration and the shaft position within the bearing clearance relative to the bearing housing of fluid film bearings. Probes and cables are available from several vendors including CTC, GE Bently, SKF, etc. Data may be acquired from the probes using instruments available from GE Bently, SKF, Shinkawa, IOtech, CSI, and National Instruments.

DETAILED DESCRIPTION

Referring to the drawings and with particular reference to the claims herein, the present device comprises a rigid body 20 having a flat magnetic rear face portion, preferably rare earth flat magnets 22 secured to body 20 by screws 21 and set screws 23 and adapted to magnetically, forcibly seat against a substantially flat surface area 24 of a shaft bearing housing 26 of magnetizable material such as iron or steel, structural means such as threaded bore 28 on said body and lock nut 29 for holding a proximity probe 30, an adjustment mechanism 32 such as threads on said structural means for spacing said probe a desired distance from the surface 33 of shaft 35, and angular positioning means 34, 36 on said device for aiming the probe axis 38 at a desired location such as 39 on the shaft surface 33.

Figures 15, 16, 17:
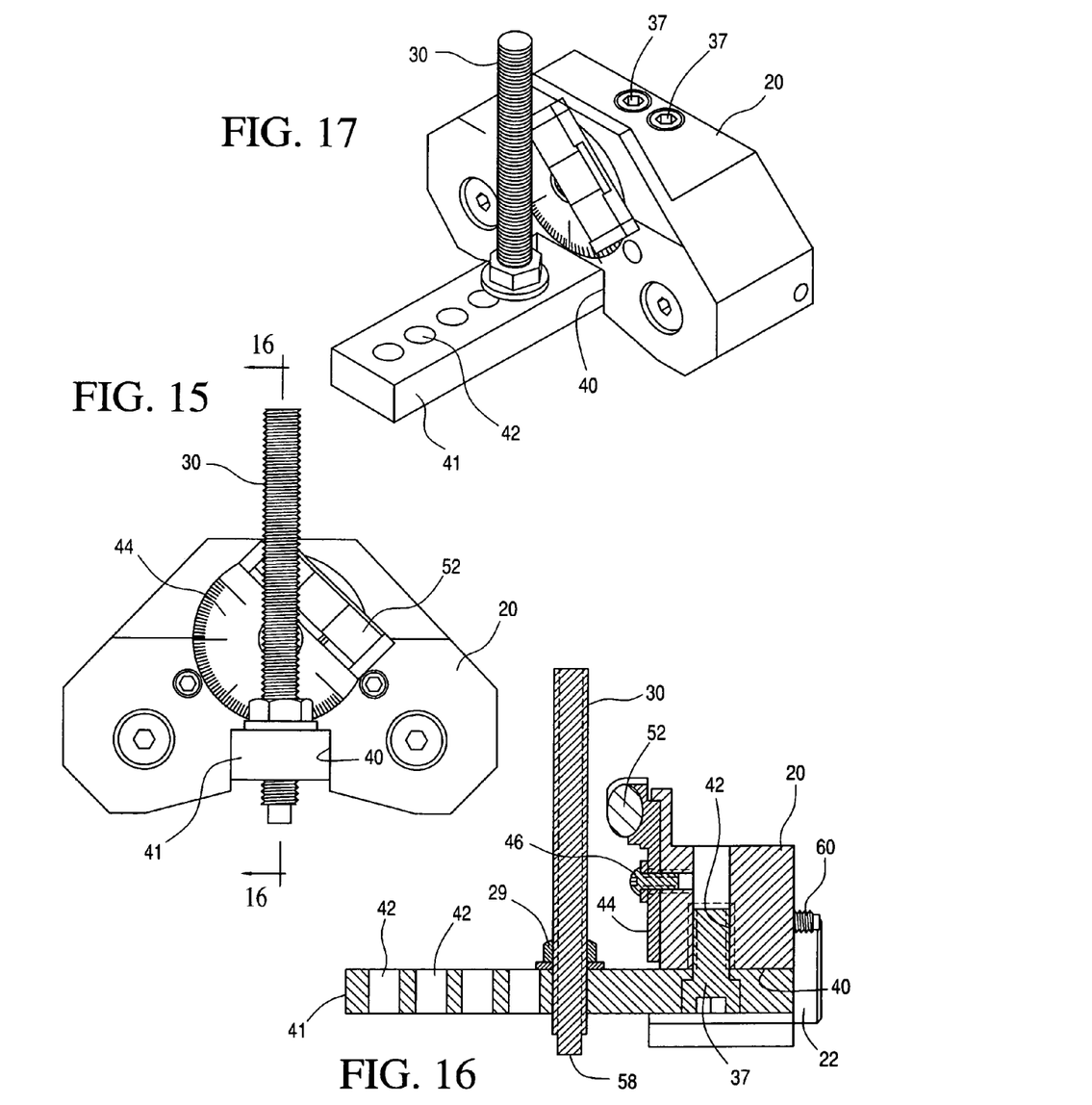
FIG. 15 is a front view of the device with the extension bar.
FIG. 16 is a cross-sectional view taken along line 16-16 in FIG. 15.
FIG. 17 is a frontal perspective view of FIG. 15.

Body 20 is composed of any strong rigid material including aluminum, steel, brass, ceramic, plastic such as butyrate, polyamide or polyurethane and preferably is provided with a cut-out 40 for accommodating an extension bar 41 affixed by a pair of screws 37 (FIG. 17) to the body, said body having threaded bores 42 whereby a probe can be affixed to the bar and positioned longitudinally along the shaft at a desired distance from the bearing housing such as, for example, to avoid rust pits or other defects in the shaft surface which could cause incorrect probe readings.

Angular positioning means 34 is used for horizontal shaft readings and comprises a protractor type of angle indicator having an angle marked face plate 44 rotatably mounted by screw 46 and compression washer 48 on body 20. A horizontal line 50 is marked on the body and is normal to the probe axis 38 and is used as a zero angle set line when aligned with 90° markings on the face plate. The probe axis positioning procedure would be to rotate and lock plate 44 either clockwise or counterclockwise at a desire angle, e.g., 45° as marked on the face plate and then angularly move body 20 around and in close proximity to the shaft until bubble level 52 which is affixed to plate 44 and is parallel to the 90° marking on the plate comes to a horizontal posture as shown, e.g., in FIG. 13. It is noted that as shown by the dotted lines in FIGS. 8 and 13 for shoulder surfaces 54 and 56, these shoulders provide lines of sight 57 (dotted) easily visible for accurately moving the body on the bearing housing face to position 54 and 56 at the same or very close to the same distance from shaft surface 33. This will insure that the probe face 58 will lie substantially tangential to shaft surface 33. Jacking screws 60 when threaded further against area 24 of the bearing housing face will force the magnets away from area 24 sufficiently to allow the device to be slid on area 24 to the desired position thereon.

The CMS Proximity Probe Mount uses two rare earth flat magnets to secure the mounts to the face of the bearing. A moveable bubble level with protractor angle gauge allows easy positioning of the probe bracket to the desired angle (such as 45 degrees). Two ¼-20 thread jacking screws are provided as aids to overcoming the strong magnetic pull when positioning or removing the probe mounts from the bearing housing. The mount body has machined surfaces which are provided as an aid to precise mounting. Extension brackets or bars are provided in two lengths to allow positioning the probes to a more desirable shaft region.

Figure 8:
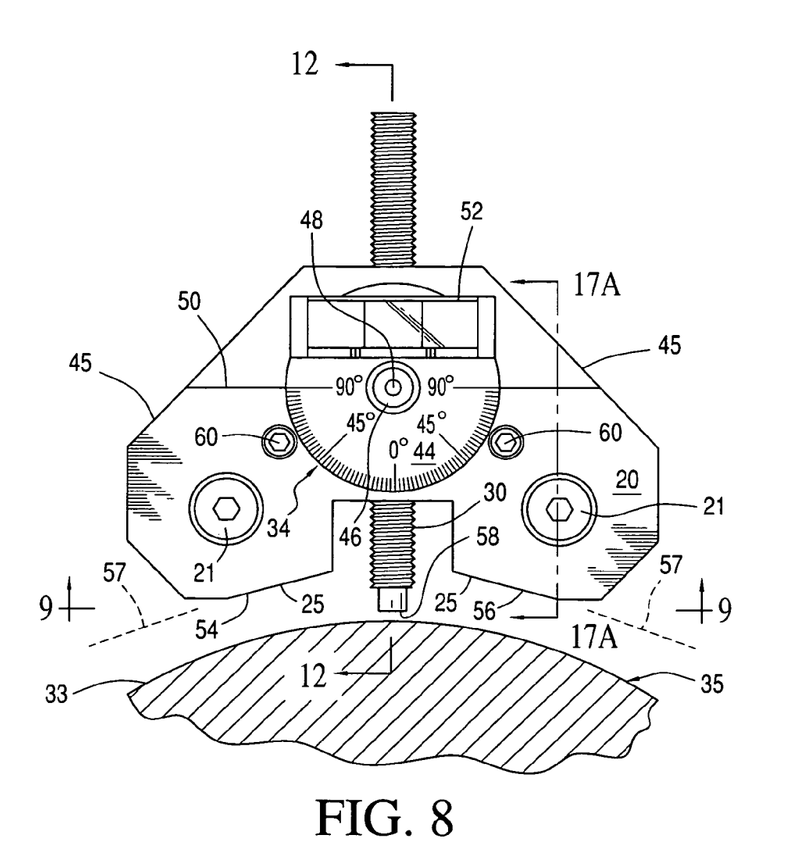
FIG. 8 is a front view of the device in an operable position adjacent a shaft surface.
Figure 9:
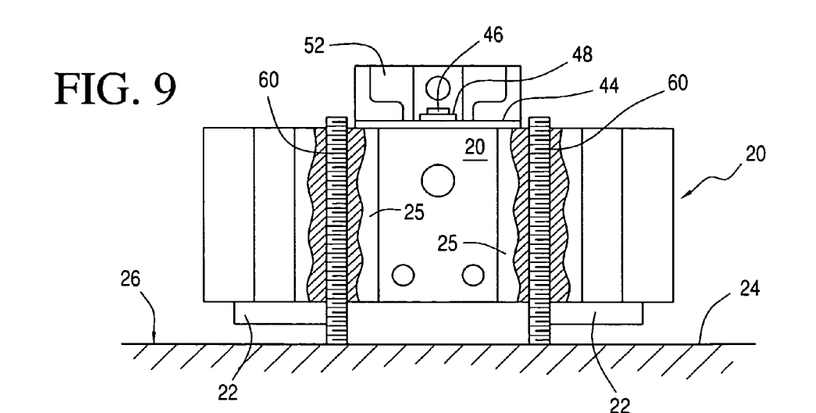
FIG. 9 is a partially cross-sectioned view taken along line 9-9 in FIG. 8 and rotated front to back.
Figure 10:
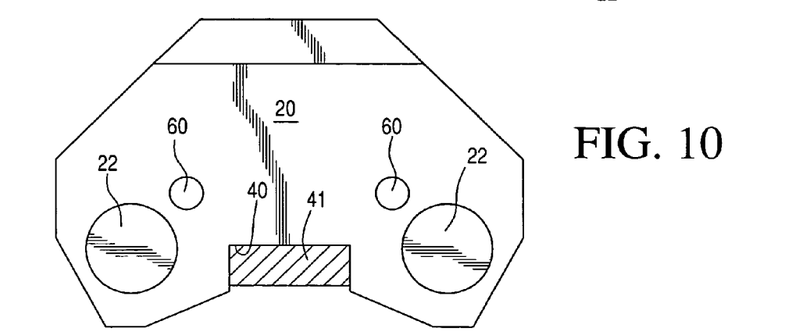
FIG. 10 is a rear view of the device.
Figure 11:
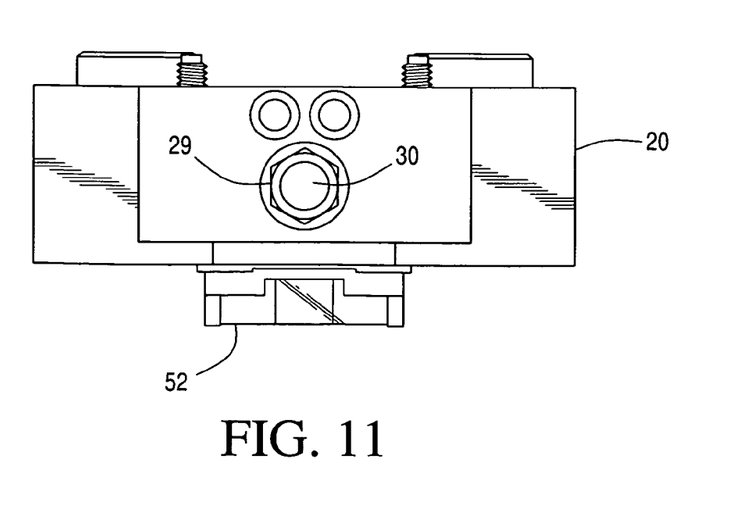
FIG. 11 is a top view of the device.
Figure 12:
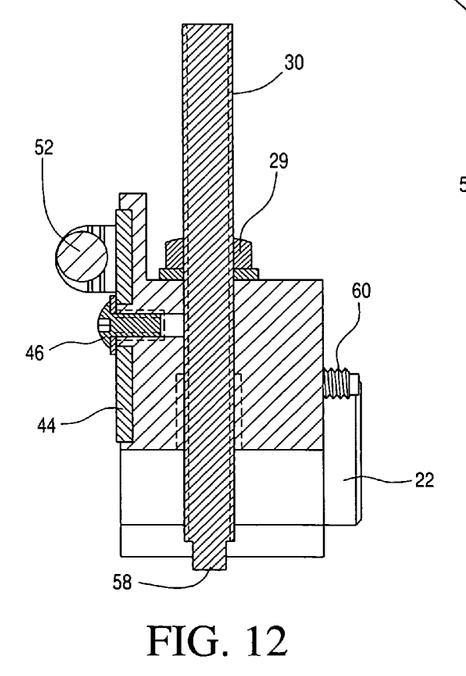
FIG. 12 is cross-sectional view of the device taken along line 12-12 in FIG. 8.

Step 1:

8 mm proximity probes (not supplied with Part No. 5067) should be screwed into the probe holders so that the probe tip extends about ½ to 1 inch from the holder as shown in FIG. 8. The jam nut should be tightened after the probe is accurately positioned to sense the shaft with a gap voltage of approximately −10V. The preferred mounting location of the probes is as close to the bearing housing as possible.

Step 2:

With the machine shutdown and the shaft not turning, clean the bearing housing and/or seal housing surfaces of all oil and grease where the probe holders will be attached. The surfaces where the magnets attach should be clean and free of burrs, loose paint, oil and grease.

The shaft surface that the proximity probes will sense will typically require cleaning or light dressing with 280 grit wet/dry abrasive paper especially if rust is present. The shaft surface that the probe will sense should be free of keyways, oil slingers, mechanical damage, plating or metal spray buildup. Where needed, the extension brackets can be employed to move the probes away to a more desirable shaft location.

Figure 20:
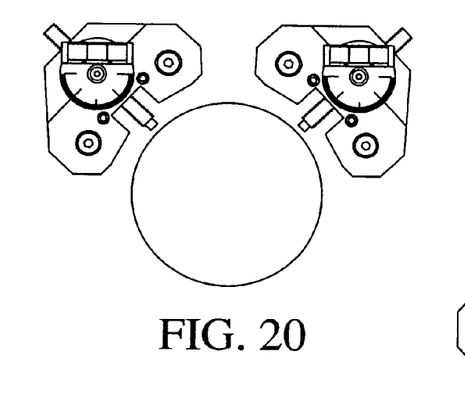
FIG. 20 shows the probe holders positioned at 45° right and left of top dead center (TDC)
Figure 21:
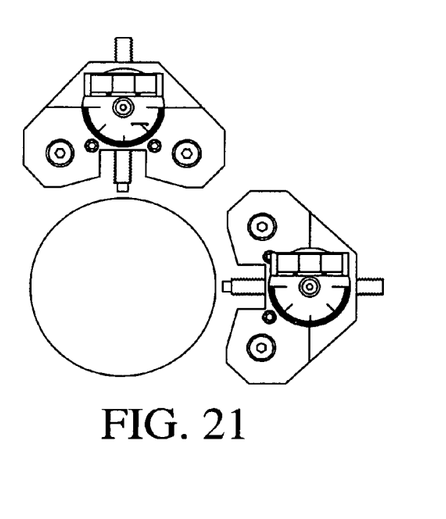
FIG. 21 shows one probe holder positioned at top dead center (vertical) and another probe holder positioned at horizontal.

Step 3:

With the machine shut down and the shaft not turning, position either one of the Removable Probe Holders on the end of the bearing housing where it is desired to measure shaft vibration. Adjust the ¼-20 thread jacking screws as needed to prevent the flat rare earth magnets fully contacting the end of the bearing housing or seal housing. The intent is to make moving the probe holders into position easier before allowing the magnets full contact with the bearing or seal housing. Position the Removable Probe Holders so that the probes are in the desired location usually True Horizontal (X) and True Vertical (Y), see FIG. 21, or 45 degrees right (X) and 45 degrees left (Y) of top dead center, see FIG. 20.

Take care when positioning the probe holders to no hit the probe tips against the shaft causing potential damage to the probes. A gap of between ¼" to ½" should be maintained between the probe tips and shaft surface. One initial positioning of the probe holders is complete, the gap between the two probe tips and shaft should be roughly the same. The adjustable level can be set to aid in positioning the probe the probe holder at the desired angle. Once the Removable Probe Holders are in the desired position, screw the jack screws out allowing the magnets to make full contact with the bearing housing or the seal housing. Insure that the removable probe holders are securely attached to the bearing housing or seal housing and cannot be easily moved by hand. If the mounting is not secure, the probe holders may move once the machine is started especially if the bearing housing has high vibration.

Figure 22:
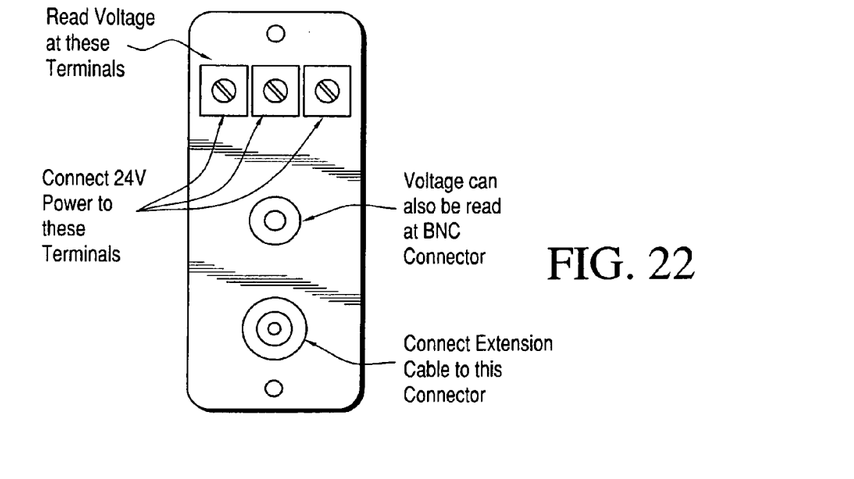
FIG. 22 shows the Probe Driver.
Figure 23:
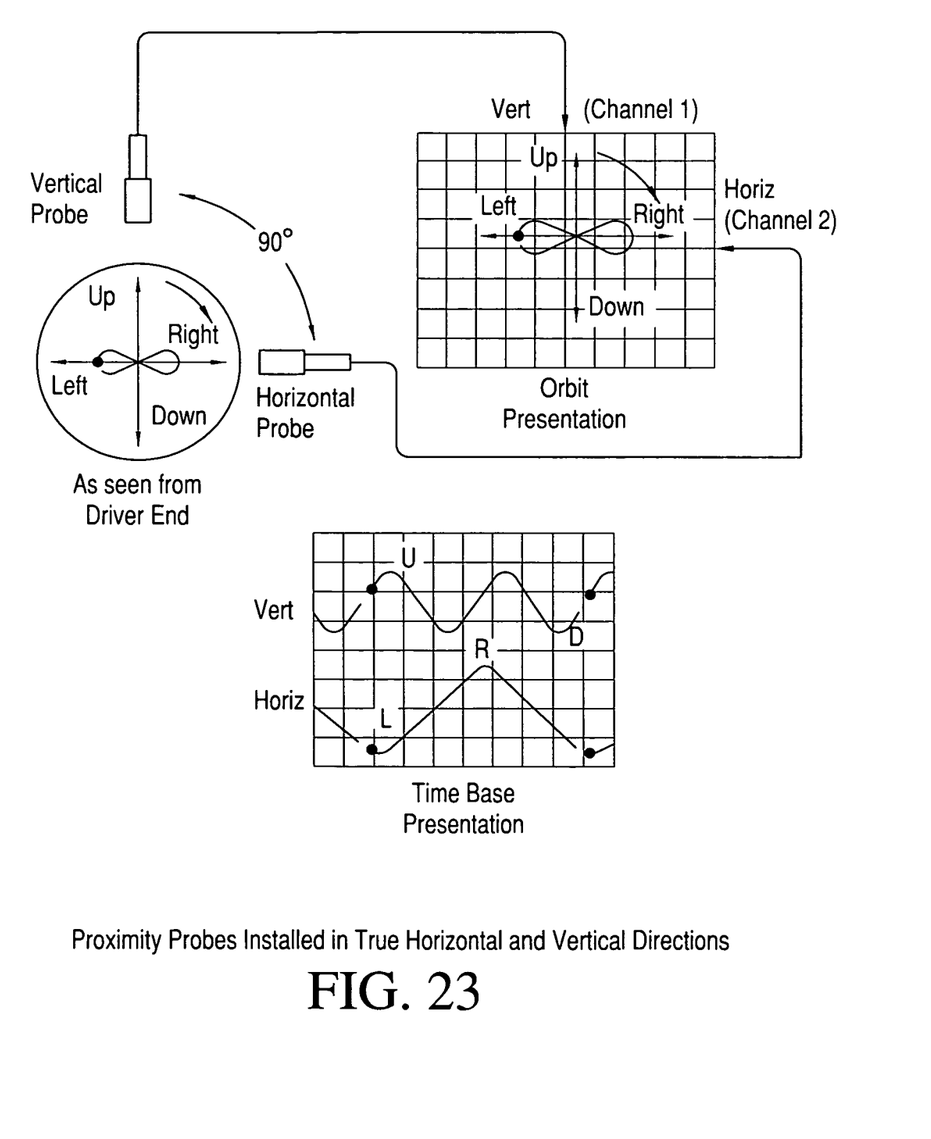
FIG. 23 graphically shows operating characteristics of the Probes installed in true horizontal and vertical directions.
Figure 24:
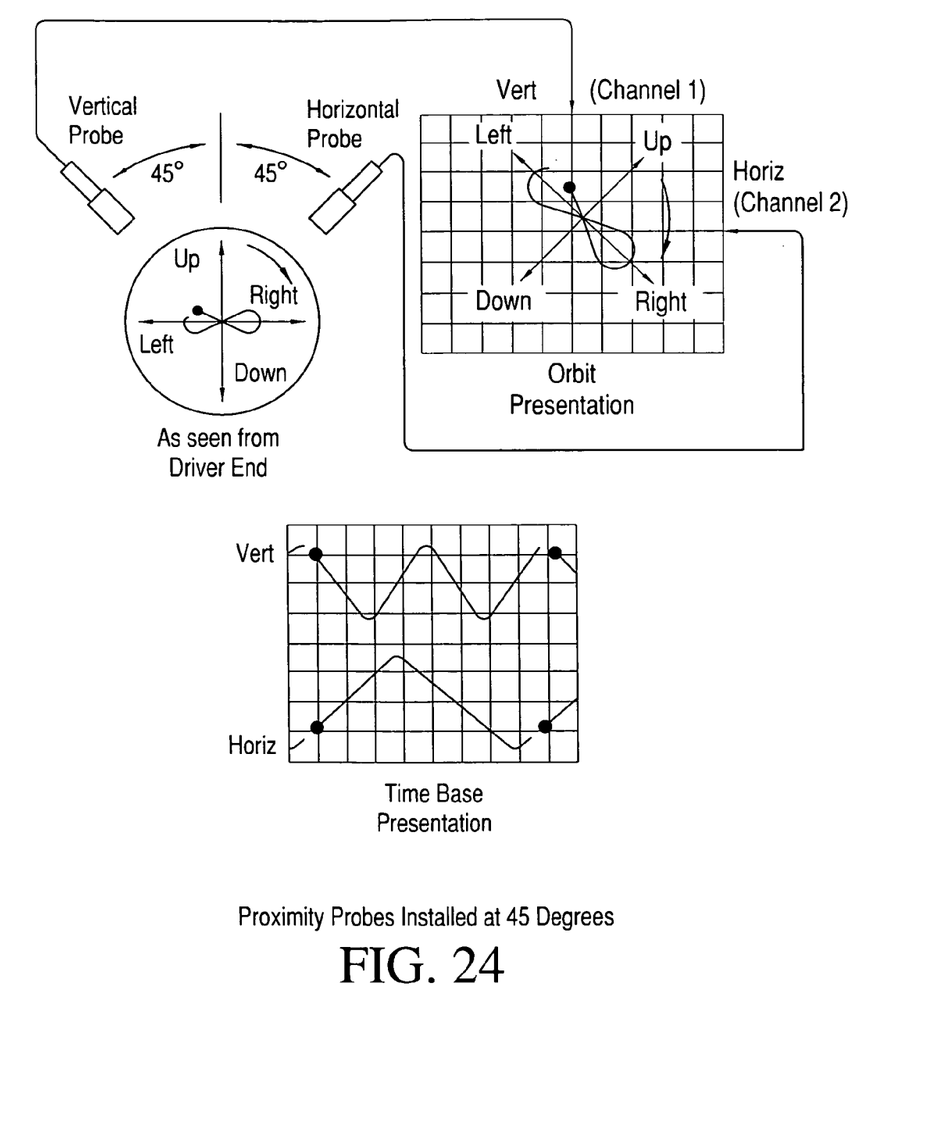
FIG. 24 graphically shows operating characteristics of the probes installed at 45° to either side of TDC.

Step 5:

Connect the Extension Cable to the Probe Cable. See FIG. 22. Then connect the extension cable to the Proximity Probe Driver. Provide −24V DC power to the Driver. Read the DC Gap Voltage at the Driver terminals OUT & COM with a vole meter or at the BNC. Adjust the prove tip distance to the shaft by rotating the probe body until −10V is read on the voltmeter. Then, tighten the probe jam nut to securely lock the probe in position.

Step 6:

Secure the probe cables using plastic wire ties or other acceptable means so that the cables cannot come into contact with the shaft during operation and potentially become entangled. Always use CAUTION when working around rotating equipment and follow all plan and government safety guidelines. Failure to follow these instructions could result in damage to the machine, process downtime, personal injury or even death.

Applications of CSM Removable Proximity Probe Mounts

1. Mounting a Proximity Probe to Generate a Once per Revolution Signal.

A once per revolution electrical pulse from a rotating shaft is used to generate a trigger signal to trigger sampling of a spectrum analyzer. The spectrum analyzer uses this signal to calculate the phase lag angle of the rotor' vibration and the RPM of the shaft. This information is used analysis of the cause of high amplitude rotor vibration and also for rotor housing. The CMS Removable Proximity Probe Mount is attached to the end of a bearing housing such as a motor bearing housing. The Probe Mount is positioned so that the proximity probe can sense the keyway in the shaft. As the shaft rotates, an electrical pulse is generated each time the keyway passes the proximity probe.

2. Mounting a Thrust Bearing Proximity Probe

Proximity probes are used to monitor the axial position of a rotor that is supported by fluid film bearings. The rotor can move a distance equal to the thrust bearing clearance (also called the thrust float). The CMS Removable Proximity Probe Mount can be mounted on the end of the bearing housing of some machines to support a proximity probe that is sensing the end of the shaft.

3. Mounting X & Y Radial Probe on a Bearing Housing (fluid film bearings)

The CMS Removable Proximity Probe Mounts can be mounted on the end of the typical fluid film bearing housing. The Probe Mounts are oriented 90 degrees apart to position the proximity probes to sense the shaft radial surface. The signal from the proximity probes is used to measure the orbital motion of the shaft as well as the shaft position within the fluid bearing clearance. The signals from the proximity probes are processed by data acquisition systems common to this application but no provided by CSM.

4. Mounting Proximity Probes on a Balance Machine

For critical high speed rotors that are to be instrumented with radial proximity probes, the surface of the shaft that is sensed by the proximity probes (also called probe track) must be finished to very low mechanical and electrical runout. The runout is typically measured in the shop that is either manufacturing the rotor or that is repairing the rotor. One method of measuring the probe track runout is to mount the CSM Removable Proximity Probe Mounts on the bearing support frame of a balance machine and while rotating the rotor slowly the runout is measured using a volt meter. The volt meter is connected to the proximity probe driver electrical terminals. Another method uses a data acquisition system to the measure the voltage signal from the proximity probe driver electrical terminals.

5. CMS Removable Proximity Probe Mount Used With Capacitance Proximity Probes

Capacitance proximity probes are immune to many of the effect that influence the vibration signal to the eddy current probe. This include chrome plated probe track, roughness, magnetic field and inconsistent target metallurgical irregularities. The physical mounting is similar and the CSM Removable Probe Mount is used in the same manner as with the eddy current type probe.

6. Vibration shaft Vibration

The shaft runout of vertical pumps can be measured by attaching the CSM Removable Proximity Probe Mount (90 degrees apart radially) to the pump bearing housing.

7. Rotor Orbit Analysis

The analysis of the shaft orbital path within a fluid film bearing offers much information about the condition of the machine and the source of excessive vibration.

Rotor Unbalance is indicated by an orbital path that is circular to slightly elliptical depending on the bearing design. The frequency of vibration is 1× the rotor rotational frequency.

A cracked rotor can be indicated by an increase in vibration at 1× and 2× the running speed frequency of the shaft and changes in the phase lag. The orbit may show size change over time.

Partial rotor rubs can be indicated by orbital 1× and 2× components. The rotor rub may modify the rotor natural frequency (critical speed). The orbits will be highly elliptical and may show reverse components (reverse precession of the rotor).

Full rotor annular rub generates vibration at 1× the rotor run speed.

Depending on the dry friction between the rotor and the seal, seal susceptibility, damping, and unbalance, the system can exhibit either forced response predominantly 1× forward response or self excited predominantly reverse response.

Fluid Induced Whirl is predominantly forward orbit with internal loops (a combination of whirl and 1× components).

Fluid Induced Whip is predominantly forward orbit with internal loops (a combination of whip and 1× components). Usually some reverse 1× and subsynchronous components are present due to the bearing pedestal stiffness anisotropy (horizontal and vertical stiffness differs).

Rotating Stall can be differentiated from a fluid induced instability by its disappearance with increased flow through the compressor.

Figure 25:
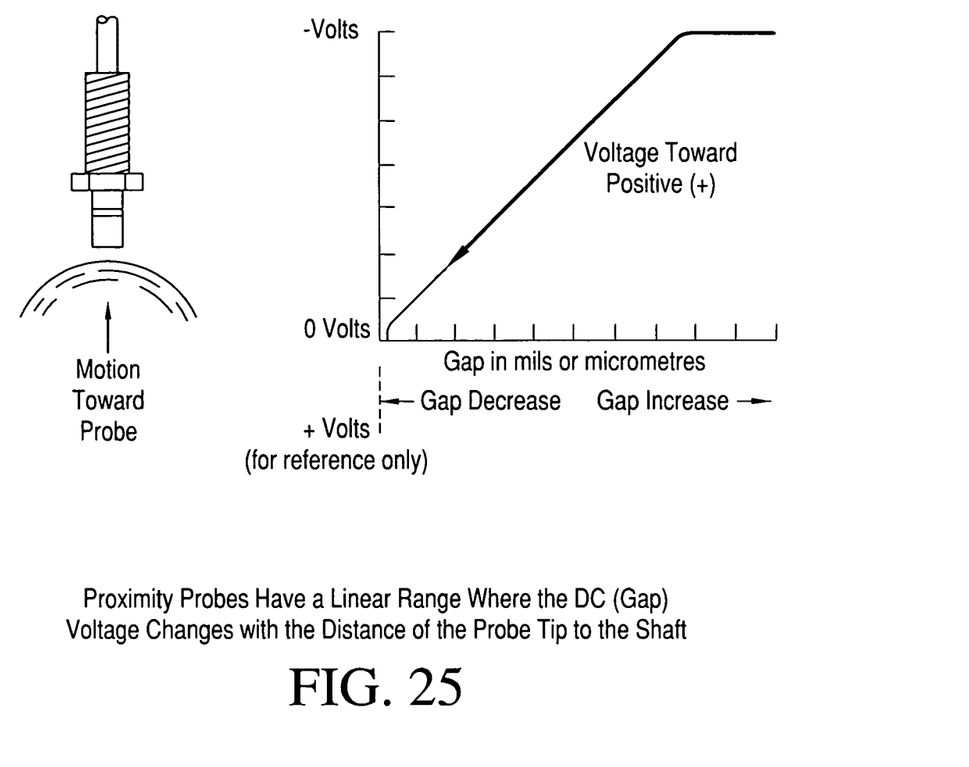
FIG. 25 graphically shows DC (Gap) voltage changes of a probe relative to distance of the probe tip to the shaft.

The proximity probe has a linear range (probe tip distance from the target material versus DC Voltage) as shown in FIG. 25. When measuring data with the proximity probes, the DC Voltage is used to plot the position of the shaft within the bearing clearance. Two probes must be used arranged 90 degrees apart. The resultant vector is plotted and this describes the shaft centerline movement in the bearing clearance during spinup or coastdown. This average shaft centerline movement is used to determine where the shaft is running within the bearing clearance and the thickness of the oil film.

Figure 1:
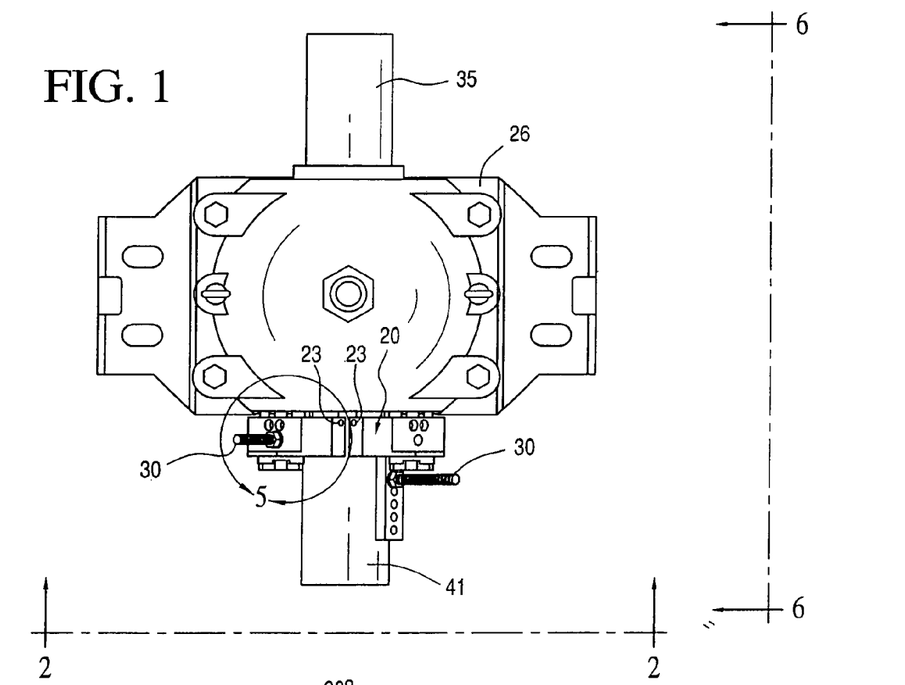
FIG. 1 is a top view of a machine shaft mounted in a bearing housing and with two of the present devices with probes mounted on the housing face.
Figure 2:
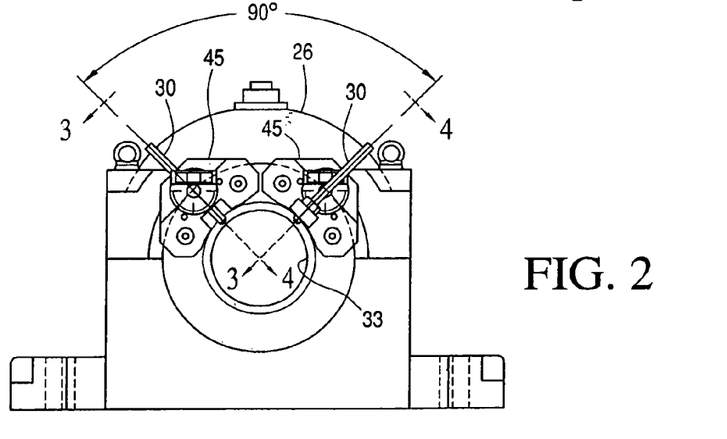
FIG. 2 is a front view taken along line 2-2 of FIG. 1.
Figure 3:
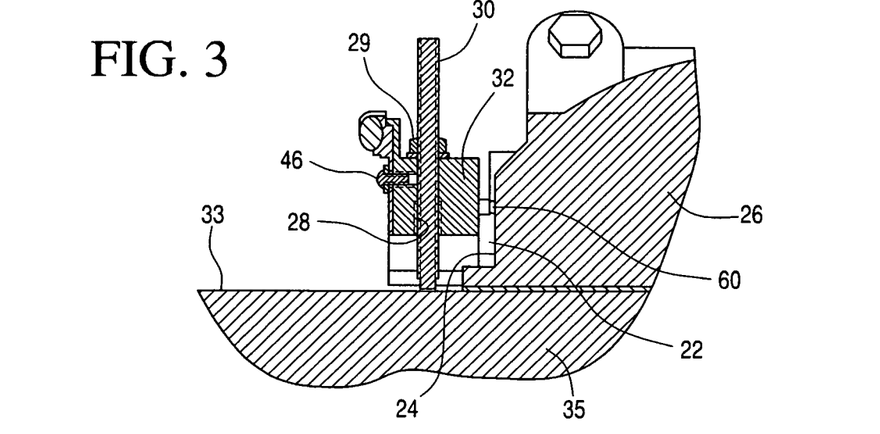
FIG. 3 is a cross-sectional view taken along line 3-3 in FIG. 2.
Figure 4:
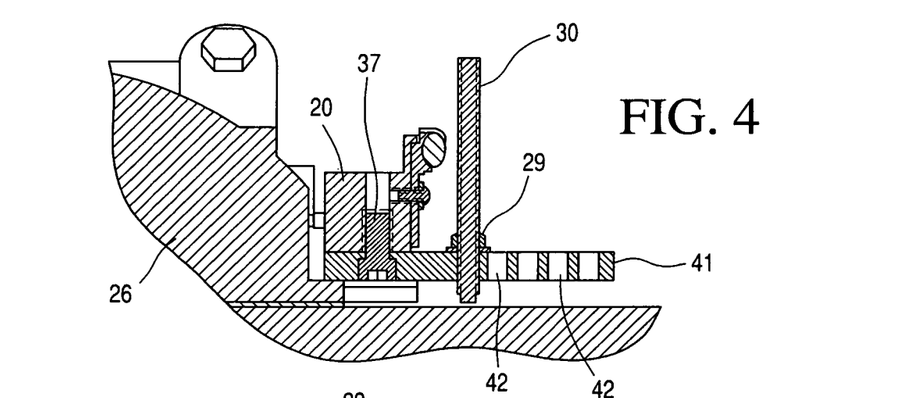
FIG. 4 is a cross-sectional view taken along line 4-4 in FIG. 2.
Figure 5:
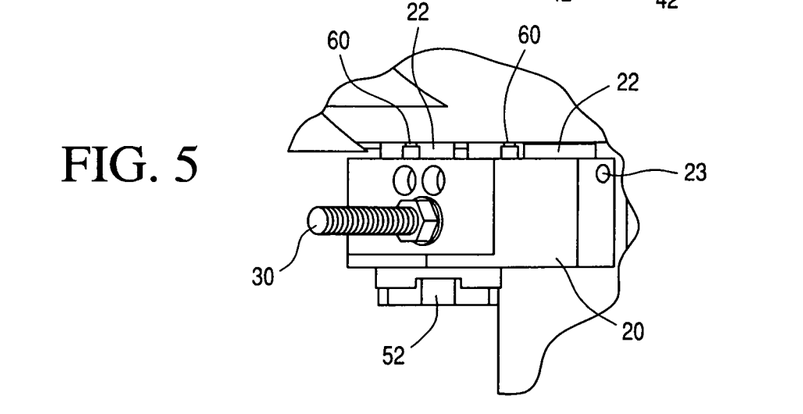
FIG. 5 is an enlarged view of the encircled area in FIG. 1.
Figure 6:
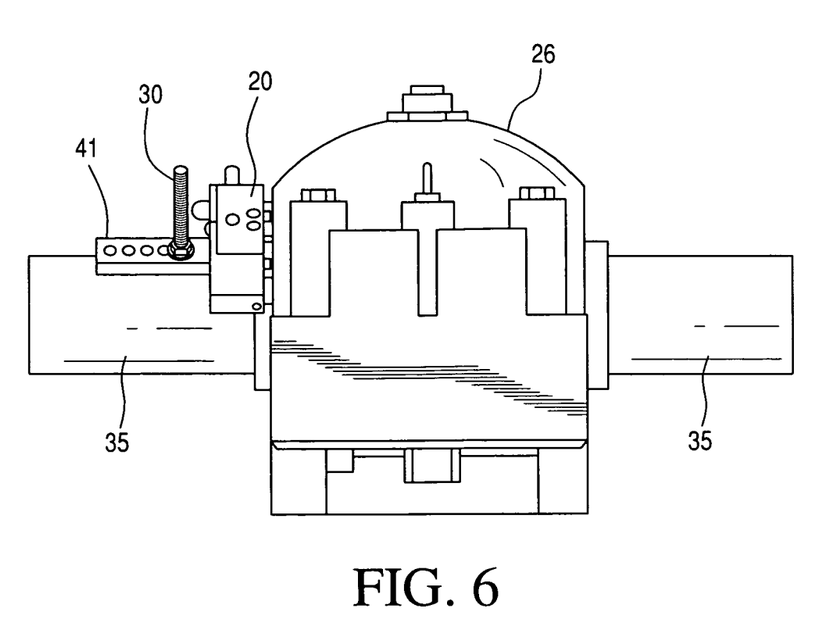
FIG. 6 is a side view taken along line 6-6 in FIG. 1.
Figure 7:
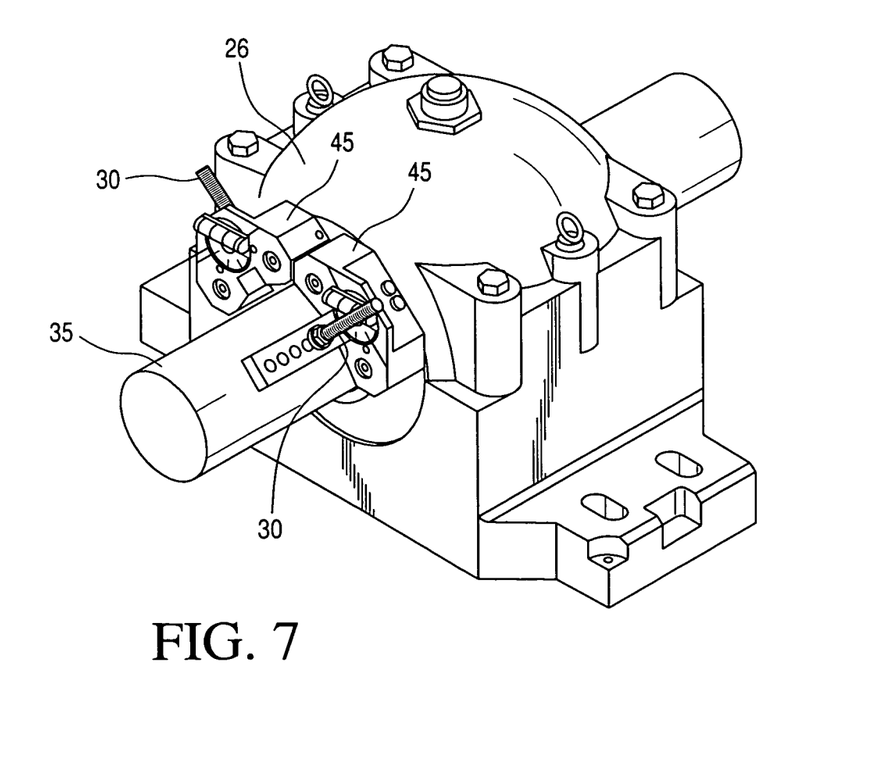
FIG. 7 is a perspective front and downward view of FIG. 1.
Figure 13:
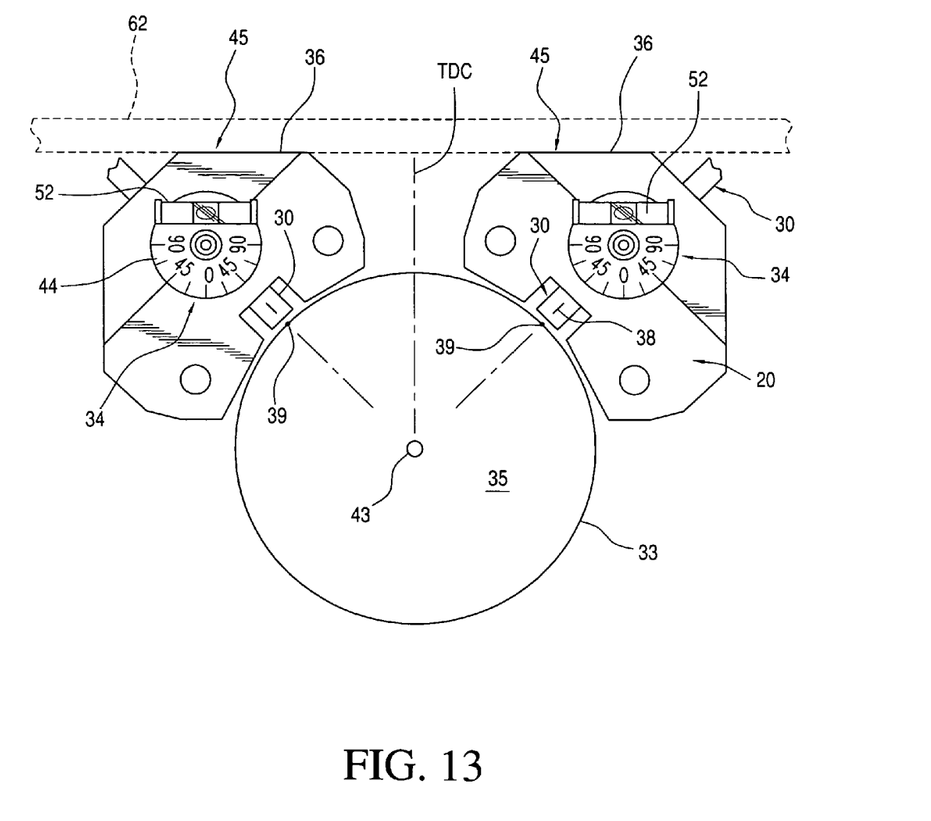
FIG. 13 is a front view of two devices each mounted at 45° to a vertical diameter "TDC" of a shaft, wherein the shaft can be horizontally or vertically mounted.
Figure 14:
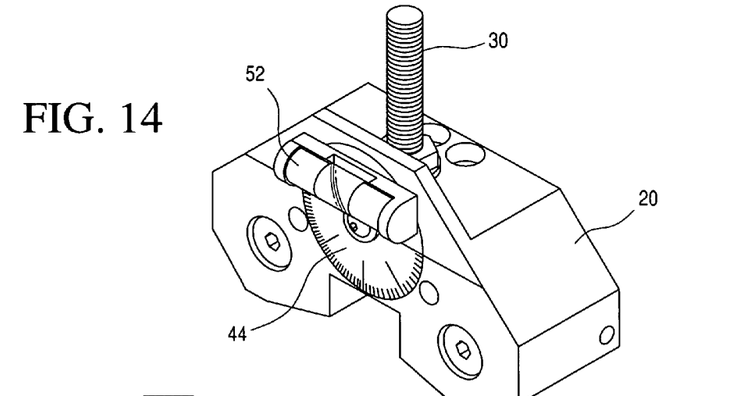
FIG. 14 is a frontal perspective view of the device.

Referring to FIG. 13, where shaft 35 is vertically mounted, levels 52 and the protractor type positioning means 34 cannot be used, however, the flat surface type of positioning means 36 on the distal edge surfaces 45 (see FIGS. 2, 7 and 13) of the body are at 45° to the probe axis 38 and when a straight edge such as 62 (dotted line) is laid across these two surfaces the axes of the two probe will be 90° apart.

Figure 16A:
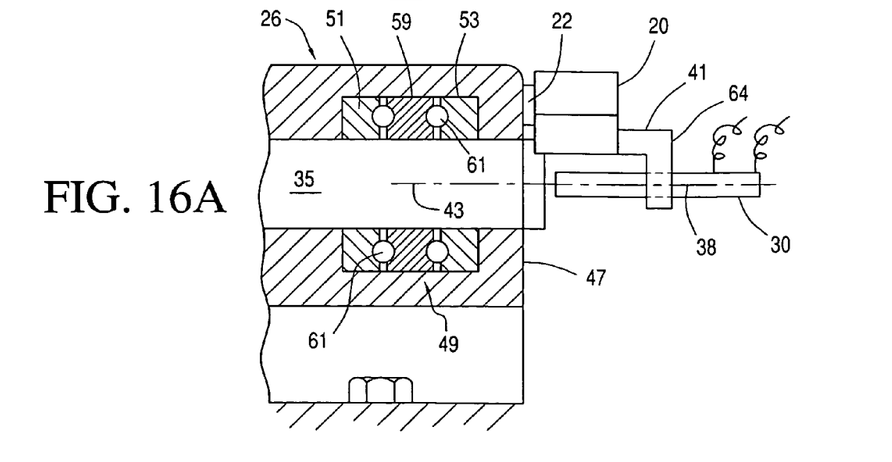
FIG. 16A is a cross-sectional view of a shaft end mounted probe variation of the present device for detecting and measuring liner motion (deviation) of the shaft.
Figure 17A:
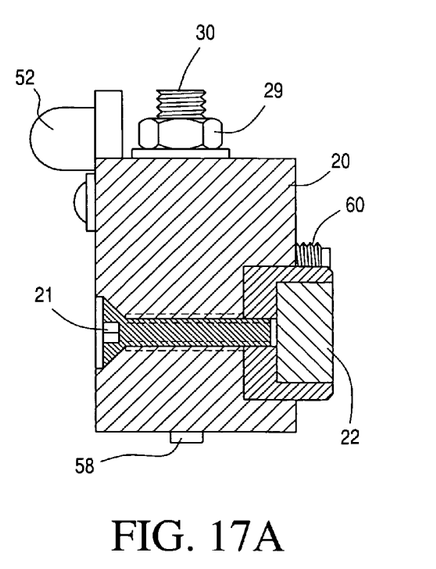
FIG. 17A is a cross-sectional view taken along line 17A-17A in FIG. 8.

Referring to FIG. 16A, the present device is adaptable for measuring linear shaft motion by way of the downward right angled configuration of the extension bar 41. The exact alignment of the probe axis 38 with the centerline (shaft axis) 43 or with any other point on the shaft diameter can be made by adjusting the position of the present device on the bearing housing face 47. This variation of the present device is particularly useful for assessing the condition of structure such as thrust bearings 49 of any structure type. The one shown is merely an example and consist of annular ball bearing races 51 and 53 press fitted into housing 26 and annular race 59 press fitted onto shaft 35 and each race running on ball bearing 61.

The invention has been described in detail with particular reference to preferred embodiments thereof, but it will be understood that variations and modifications will be effected with the spirit and scope of the invention.

We claim:

1. A device for mounting a proximity probe in operating position on a machine having a rotatable shaft and wherein the probe is used for detecting rotating shaft deviation, said device comprising a rigid body having a flat magnetic rear face portion adapted to magnetically, forcibly seat against a substantially flat surface area of a shaft bearing housing of magnetizable material, structural means on said body for holding the proximity probe, an adjustment mechanism on said structural means for spacing said probe at a desired distance from a shaft surface, and positioning means on said device for aiming the probe at a desired location on the shaft surface.

2. The device of claim 1 wherein said positioning means comprises an angle indicator for assisting in placing said body on said surface area whereby a probe axis can be aimed at a selected location on the shaft surface, which location is at a prescribed and selected angular position around the shaft.

3. The device of claim 2 wherein said positioning means further comprises a pair of spaced shoulders on a proximate edge surface of said body, and wherein a sight plane of each of said shoulders is substantially tangential to the surface of the shaft.

4. The device of claim 3 wherein said angle indicator comprises a protractor instrument rotatably mounted on a front face portion of said body, wherein a bubble level is affixed to said face portion with a level axis normal to the probe axis when the probe axis runs vertically thru a vertical diameter of the shaft.

5. The device of claim 4 wherein a distal edge portion of said body is provided at each side of said probe axis with a flat surface portion lying in a plane at a 45° angle to said probe axis.

6. The device of claim 5 wherein said magnetic rear face portion comprises a pair of spaced permanent magnets and wherein screw jacking means is threadedly mounted thru said body from said front face portion to said rear face portion of said device at a location adjacent to each magnet for forcibly engaging said bearing housing and moving said magnets and said body away from said bearing housing as needed for removal of the device from the machine or for allowing sliding positioning adjustment of the device on said machine.

7. The device of claim 4 wherein said structural means comprises an extension bar removably affixed to said body and having a portion extending outwardly and axially from said front face portion, wherein from 1-10 threaded bores are formed through said bar for selecting threadedly receiving a threaded portion of said probe.

8. The device of claim 7 wherein said portion of said extension bar is formed having an end with a right angle turned down section (64) which can hold a probe with its axis aligned with the shaft axis or with any other point on the shaft diameter.

9. The device of claim 4 wherein said instrument has a zero angle marking aligned with the probe axis and further has graduated 0° to 90° angle markings in a semi-circular pattern on either side of said zero angle marking.

10. The combination of (1) a shaft rotatably mounted in a bearing housing of magnetizable material wherein a front face portion of said housing has a substantially flat surface area surrounding said shaft, and (2) a proximity probe device for detecting rotating shaft deviation, wherein said device has a rigid body having a flat magnetic rear face portion magnetically, forcibly seating against said substantially flat surface area of said bearing housing, structural means on said body holding a proximity probe, an adjustment mechanism on said structural means for spacing said probe at a desired distance from a shaft surface, and angular positioning means on said device aiming the probe at a desired location on the shaft surface.

11. The device of claim 10 having an angle indicator for assisting in placing said body on said surface area whereby a probe axis can be aimed at a selected location on the shaft surface, which location is at a prescribed and selected angular position around the shaft.

12. The device of claim 11 wherein said positioning means additionally comprises a pair of spaced shoulders on a proximate edge surface of said body, and wherein a sight plane of said shoulders is substantially tangential to the surface of the shaft.

13. The device of claim 12 wherein said angle indicator comprises a protractor instrument rotatably mounted on a front face portion of said body, wherein a bubble level is affixed to said face portion of said body with the level axis normal to the probe axis when the probe axis runs vertically through a vertical diameter of the shaft.

14. The device of claim 13 wherein a distal edge portion of said body is provided at each side of said probe axis with a flat surface portion lying in a plane at a 45° angle to said probe axis.

15. The device of claim 14 wherein said magnetic face portion comprises a pair of spaced permanent magnets and wherein screw jacking means is threadedly mounted thru said body from said front face portion to said rear face portion at a location adjacent to each magnet for forcibly engaging said bearing housing and moving said magnets and said body away from said bearing housing.

16. The device of claim 13 wherein said structural means comprises an extension bar removably affixed to said body and extending outwardly from said front face portion, wherein from 1-10 threaded bores are formed through said bar for selectively, threadedly receiving a threaded portion of said probe.

17. The device of claim 13 wherein said instrument has a zero angle marking aligned with the probe axis and a graduated 0° to 90° angle marking in a semi-circular pattern on either side of said zero angle marking.

* * * * *